US012246275B2

(12) United States Patent
Dionne

(10) Patent No.: US 12,246,275 B2
(45) Date of Patent: *Mar. 11, 2025

(54) DISC FILTERS AND METHODS OF OPERATING DISC FILTERS

(71) Applicant: Kadant Black Clawson LLC, Lebanon, OH (US)

(72) Inventor: Hugues Dionne, Le Gardeur (CA)

(73) Assignee: Kadant Black Clawson LLC, Lebanon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,374

(22) Filed: Dec. 19, 2023

(65) Prior Publication Data
US 2024/0115978 A1 Apr. 11, 2024

Related U.S. Application Data

(63) Continuation of application No. 17/261,751, filed as application No. PCT/US2019/045943 on Aug. 9, 2019, now Pat. No. 11,883,766.
(Continued)

(51) Int. Cl.
*B01D 33/21* (2006.01)
*B01D 33/46* (2006.01)
(Continued)

(52) U.S. Cl.
CPC ............ *B01D 33/21* (2013.01); *B01D 33/463* (2013.01); *B01D 33/68* (2013.01); *B01D 33/806* (2013.01)

(58) Field of Classification Search
CPC ...... B01D 33/21; B01D 33/463; B01D 33/68; B01D 33/806; B01D 33/46; B01D 33/80;
(Continued)

(56) References Cited

U.S. PATENT DOCUMENTS 4,136,028 A   1/1979   Toivonen
6,258,282 B1  7/2001   Strid et al.
(Continued)

FOREIGN PATENT DOCUMENTS

CN   103068461 A    4/2013
CN   109091938 A   12/2018
(Continued)

OTHER PUBLICATIONS

International Search Report and Written Opinion mailed on Oct. 28, 2019, for application No. PCT/US/2019/045943, 11 pages.
(Continued)

*Primary Examiner* — Akash K Varma
(74) *Attorney, Agent, or Firm* — Dinsmore & Shohl LLP

(57) ABSTRACT

Disclosed herein are disc filters for dewatering a fiber suspension. According to a first aspect, the disc filter includes a vessel comprising an inlet positioned in a wall of the vessel, the inlet introducing a fiber suspension into the vessel. The disc filter further includes a rotor shaft comprising a shaft axis of rotation positioned in a shaft plane, wherein the shaft plane is a horizontal plane. At least one filter element may be coupled to the rotor shaft. At least one injector may be positioned in the wall of the vessel, the at least one injector introducing a secondary flow of liquid into the vessel. The at least one injector may be located in the wall of the vessel at an injector elevation angle $\alpha_I$ that is greater than −44 degrees and less than or equal to +22 degrees relative to the shaft plane.

17 Claims, 12 Drawing Sheets

Related U.S. Application Data

(60) Provisional application No. 62/717,126, filed on Aug. 10, 2018.

(51) Int. Cl.
    *B01D 33/68* (2006.01)
    *B01D 33/80* (2006.01)

(58) Field of Classification Search
    CPC ........ B01D 33/00; B01D 33/76; B01D 33/23; B01D 2201/46; B01D 29/41; B01D 29/60; B01D 29/64; B01D 29/86; D21D 5/00
    USPC .......................................... 210/780
    See application file for complete search history.

(56) References Cited

U.S. PATENT DOCUMENTS

| | | | |
|---|---|---|---|
| 6,460,706 B1 * | 10/2002 | Davis | B07B 4/08 |
| | | | 209/672 |
| 9,238,188 B2 | 1/2016 | Strid et al. | |
| 2013/0105382 A1 | 5/2013 | Strid et al. | |
| 2021/0291087 A1 | 9/2021 | Dionne | |

FOREIGN PATENT DOCUMENTS

| | | | | |
|---|---|---|---|---|
| GB | 348556 A | | 5/1931 | |
| JP | H0949181 A | | 2/1997 | |
| WO | WO-9816292 A2 | * | 4/1998 | ............. B01D 33/23 |
| WO | 2011/159235 A1 | | 12/2011 | |
| WO | WO-2017007417 A1 | * | 1/2017 | ............. B01D 33/21 |

OTHER PUBLICATIONS

European Patent Office, Communication Pursuant to Rules 161(1) and 162 EPC, 3 pgs, Mar. 17, 2021.
China National Intellectual Property Administration; Chinese Office Action; App. No. 201980053294.5; Dec. 21, 2021; 13 pgs.
Communication pursuant to Article 94(3) EPC dated Sep. 21, 2022, pertaining to EP Patent Application No. 19759192.8, 4 pgs.
Japanese Office Action dated May 24, 2023, Pertaining to JP Patent Application No. 2021-505212, 14 pgs.

* cited by examiner

DISC FILTERS AND METHODS OF OPERATING DISC FILTERS

CROSS-REFERENCE TO RELATED APPLICATIONS

The present application is a continuation of co-pending U.S. patent application Ser. No. 17/261,751, filed Jan. 20, 2021, and entitled "Disc Filters and Methods of Operating Disc Filters," which is a National Stage Entry under 35 U.S.C. § 371 of International Application No. PCT/US2019/045943, filed Aug. 9, 2019, and entitled "Disk Filter and Methods of Operating Disc Filters," which claims the benefit of priority to U.S. Provisional Patent Application Ser. No. 62/717,126 filed Aug. 10, 2018 and entitled "Disc Filters and Methods of Operating Disc Filters", the entire contents of all of which are incorporated by reference herein.

BACKGROUND

Field

The present specification generally relates to disc filters for separating cellulose fiber from a fiber suspension and, more specifically, to disc filters with injectors for agitating the suspension during a filtration operation.

Technical Background

Typical disc filters used in the pulp and paper industry for dewatering cellulose fiber suspensions generally include a number of disc-shaped filter elements mounted on a rotatable shaft such that the filter elements rotate together with the rotor shaft inside a vessel. The disc-shaped filter elements are partly immersed in a cellulose fiber suspension contained within the vessel. Each filter element may include several filter sectors distributed about the rotatable shaft. Each filter sector is provided with an external filter lining, such as a screen or the like, and internal flow channels communicating with filtrate channels in the rotatable shaft.

When the filter elements are rotated with the rotatable shaft, the filter sectors move through the suspension in the vessel. As the filter sectors move through the suspension, water is sucked from the suspension, through the filtering lining on the filter sectors and into the flow channels inside the filter sectors, while fiber material is deposited as a fiber mat on the external surfaces of the filtering lining. The filtrate comprising said water then flows from the flow channels in the filter sectors to the filtrate channels in the rotor shaft and is discharged from the vessel through a filtrate outlet. On continued rotation of the filter elements, the filter sectors move out of the suspension and past spray nozzles, which direct jets of fluid towards the fiber mat to thereby loosen the fiber mat from the filtering lining. The fiber material loosened from the filtering lining falls down into receiver chutes located alongside of the filtering lining on each side of the respective filter element in the part of the vessel where the filter sectors are rotated out of the suspension after having moved through the suspension, i.e. on the side of the rotor shaft where the filter sectors move upwards during the rotation of the filter elements. At the bottom of the receiver chutes the fiber material is picked up by a conveyor and passed on for further processing.

However, a need exists for alternative disc filters for separating cellulose fiber from a suspension.

SUMMARY

According to a first aspect, a disc filter for dewatering a fiber suspension includes a vessel comprising an inlet positioned in a wall of the vessel, the inlet introducing a fiber suspension into the vessel. The disc filter further includes a rotor shaft comprising a shaft axis of rotation positioned in a shaft plane, wherein the shaft plane is a horizontal plane. At least one filter element may be coupled to the rotor shaft such that the at least one filter element rotates with the rotor shaft about the shaft axis of rotation. At least one injector may be positioned in the wall of the vessel, the at least one injector introducing a secondary flow of liquid into the vessel. The liquid may be, for example, water or fiber suspension. The at least one injector may be located in the wall of the vessel at an injector elevation angle $\alpha_I$ that is greater than −44 degrees and less than or equal to +22 degrees relative to the shaft plane. A primary flow vector of the at least one injector may be orthogonal to the shaft axis of rotation.

A second aspect (2) includes the disc filter of the first aspect, wherein: a primary component of an angular velocity vector ω of the at least one disc filter element is in a positive vertical direction proximate the at least one injector; and the primary component of the angular velocity vector ω of the at least one disc filter element is in a negative vertical direction proximate the inlet.

A third aspect (3) includes the disc filter of the first aspect (1) or the second aspect (2), wherein the injector elevation angle $\alpha_I$ is 0 degrees relative to the shaft plane.

A fourth aspect (4) includes the disc filter of the first aspect (1) or the second aspect (2), wherein the injector elevation angle $\alpha_I$ is less than 0 degrees and greater than or equal to −44 degrees relative to the shaft plane or greater than 0 degrees and less than or equal to +22 degrees relative to the shaft plane.

A fifth aspect (5) includes the disc filter of the first aspect (1) or the second aspect (2), wherein the injector elevation angle $\alpha_I$ is greater than or equal to −15 degrees and less than or equal to +15 degrees relative to the shaft plane.

A sixth aspect (6) includes the disc filter of the first aspect (1) or the second aspect (2), wherein the injector elevation angle $\alpha_I$ is greater than or equal to −10 degrees and less than or equal to +10 degrees relative to the shaft plane.

A seventh aspect (7) includes the disc filter of any of the first (1) through sixth (6) aspects, wherein the primary flow vector of the at least one injector intersects with the shaft axis of rotation.

An eighth aspect (8) includes the disc filter of any of the first (1) through seventh (7) aspects, wherein the secondary flow of the liquid from the at least one injector diverges vertically along the primary flow vector.

A ninth aspect (9) includes the disc filter of any of the first (1) through eighth (8) aspects, wherein an outlet of the at least one injector comprises a major axis and a minor axis, wherein a length of the major axis is greater than a length of the minor axis.

A tenth aspect (10) includes the disc filter of any of the first (1) through ninth (9) aspects, wherein a width of the outlet varies along the major axis.

An eleventh aspect (11) includes the disc filter of any of the first (1) through tenth (10) aspects, wherein the outlet has a dog bone cross section.

A twelfth aspect (12) includes the disc filter of any of the first (1) through eleventh (11) aspects, wherein an outlet of the at least one injector is disposed between an outer radius of the at least one filter element and the wall of the vessel.

A thirteenth aspect (13) includes the disc filter of any of the first (1) through eleventh (11) aspects, wherein an outlet of the at least one injector is disposed between an outer radius of the at least one filter element and the rotor shaft.

A fourteenth aspect (14) includes the disc filter of any of the first (1) through thirteenth (13) aspects, wherein the at least one filter element comprises a pair of adjacent filter elements and the at least one injector is positioned in a space between the pair of adjacent filter elements.

A fifteenth aspect (15) includes the disc filter of any of the first (1) through sixth (14) aspects, wherein the at least one injector is positioned below a fill level of the fiber suspension in the vessel.

A sixteenth aspect (16) includes the disc filter of any of the first (1) through fifteenth (15) aspects, wherein the at least one injector is coupled to a feed manifold through an injector valve.

A seventeenth aspect (17) includes the disc filter of the sixteenth aspect (16), wherein the injector valve is communicatively coupled to a control system.

An eighteenth aspect (18) includes the disc filter of any of the sixteenth (16) through seventeenth (17) aspects, wherein the at least one injector is coupled to the injector valve through a flow meter.

A nineteenth aspect (19) includes the disc filter of the eighteenth (18) aspect, wherein the flow meter and the injector valve are communicatively coupled to a control system.

A twentieth aspect (20) includes the disc filter of any of the first (1) through seventeenth (17) aspects, wherein the at least one injector is coupled to a feed manifold through a flow meter.

A twenty-first aspect (21) includes the disc filter of any of the first (1) through twentieth (20) aspects, wherein the secondary flow of the liquid from the at least one injector contacts the rotor shaft.

A twenty-second aspect (22) includes the disc filter of any of the first (1) through twenty second (21) aspects, wherein the secondary flow of the liquid from the at least one injector does not contact a surface of the at least one filter element.

A twenty-third aspect (23) includes a disc filter with at least one injector as shown and described herein.

A twenty-fourth (24) aspect includes a method of operating a disc filter as shown and described herein.

Additional features and advantages of the disc filters described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
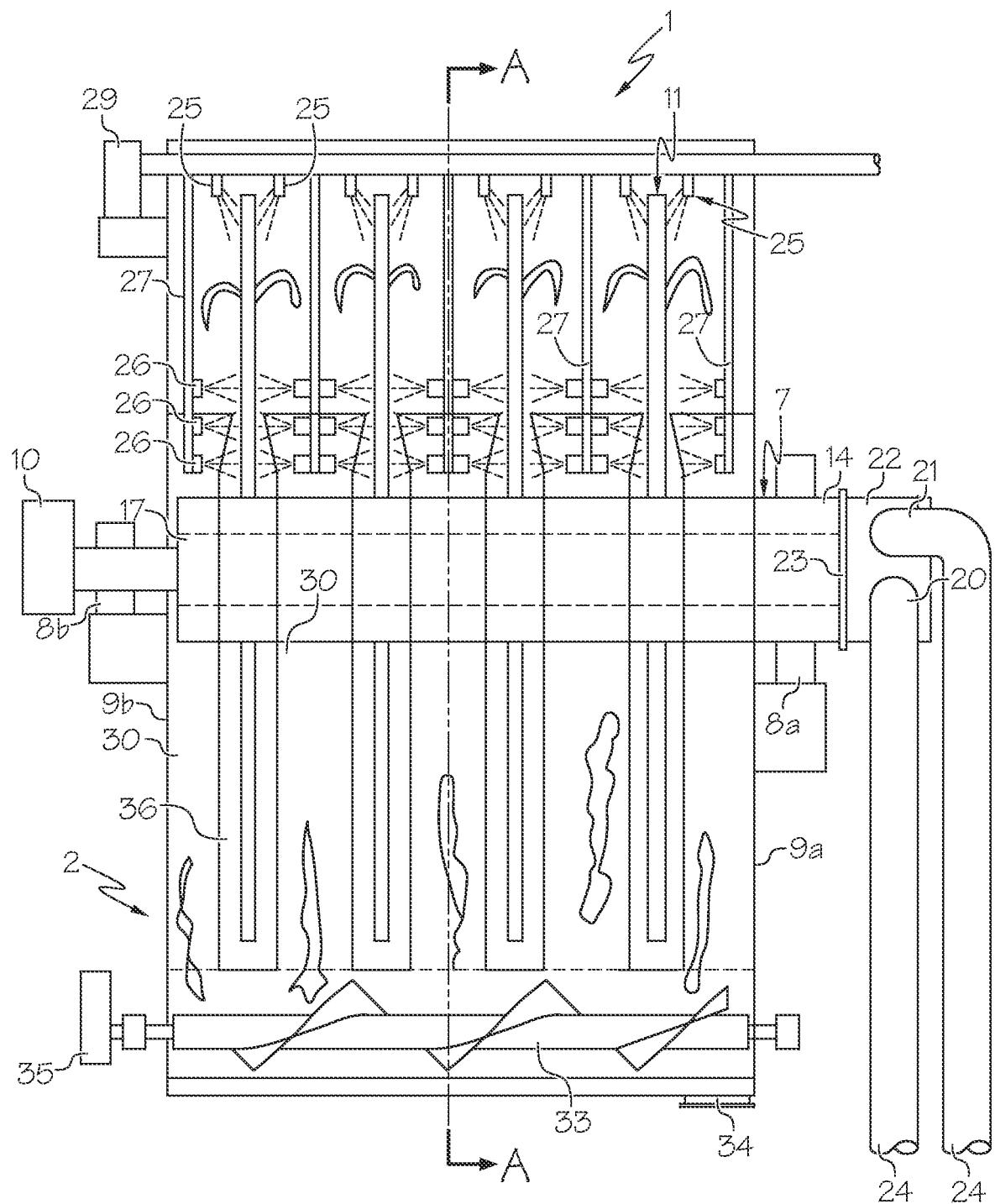
FIG. 1 schematically depicts an axial cross section of a disc filter according to one or more embodiments shown and described herein.

Reference will now be made in detail to embodiments of the disc filters described herein, examples of which are illustrated in the accompanying drawings. Whenever possible, the same reference numerals will be used throughout the drawings to refer to the same or like parts. One embodiment of a disc filter is schematically depicted FIG. 1 and generally includes a vessel comprising an inlet positioned in a wall of the vessel, the inlet introducing a fiber suspension into the vessel. The disc filter further includes a rotor shaft comprising a shaft axis of rotation positioned in a shaft plane, wherein the shaft plane is a horizontal plane. At least one filter element may be coupled to the rotor shaft such that the at least one filter element rotates with the rotor shaft about the shaft axis of rotation. At least one injector may be positioned in the wall of the vessel, the at least one injector introducing a secondary flow of liquid into the vessel. The at least one injector may be located in the wall of the vessel at an injector elevation angle $\alpha_I$ that is greater than −44 degrees and less than or equal to +22 degrees relative to the shaft plane. A primary flow vector of the at least one injector may be orthogonal to the shaft axis of rotation. Various embodiments of disc filters and method for operating the same will be described herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The terms "free" and "freeness," as used herein, refer to the propensity of a suspension to be readily separated into its solids fraction and its liquid fraction. For example, cellulosic fiber is more readily separated from a suspension with a "high freeness" as compared to a suspension with a "low freeness."

Disc filters are used to separate cellulose fiber from a suspension of the fiber in a fluid, such as water. Examples of disc filters are disclosed in: U.S. Pat. No. 9,238,188 entitled "Disc Filter" and assigned to Kadant Black Clawson Inc.; U.S. Pat. No. 4,136,028 entitled "Method for filtering a fibrous material by means of a disc filter as well as a disc filter for performing the method" and assigned to Rauma-Rapola Oy; and U.S. Pat. No. 6,258,282 entitled "Rotatable filter system for filtration of a flowing substance" and assigned to Kvaerner Pulping AB. Such filters are effective for removing filtrate from a cellulose suspension having a relatively high freeness. However, it has been found that the efficiency of such disc filters may decrease with increasing freeness of the suspension. Specifically, it has been found that, when separating fiber from filtrate in fiber suspensions having a relatively high freeness, the fiber mat that accumulates on the filter elements may fall back into the fiber suspension as the filter elements rotate out of the suspension.

It has been determined that there are several factors that work in concert with one another to cause the fiber mat to fall back into the fiber suspension. Specifically, the relatively high freeness of the suspension causes filtrate to be removed from the fiber suspension at a greater rate than the fiber is removed from the suspension. This causes the suspension to thicken. The thickened suspension acts as a mechanical scraper against the filter element as the filter element rotates through the suspension. The mechanical scraping action of the thickened suspension damages the fiber mat at the surface of the filter element. The damage caused to the mat may manifest as localized thinning such that air can penetrate through the mat and decrease the vacuum holding the mat to the filter element. As the suspension continues to thicken upon the removal from the suspension of more filtrate than fiber, the thickened suspension may actually pull the fiber mat from the surface of the filter element as the filter element emerges from the suspension. This action decreases the efficiency of the disc filter.

In addition, the rapid removal of the filtrate from the suspension causes a decrease in the vacuum that keeps the fiber mat adhered to the filter elements. Specifically, when the filtrate is removed from the suspension at a much greater rate than the fiber, not enough filtrate is left in the suspension to compensate for the air penetrating through the mat due to the mechanical scraping action of the thickened suspension. The decrease or loss of vacuum causes the fiber mat to be more readily and prematurely removed from the filter element due to the mechanical scraping of the thickened suspension. Thus, the decrease in vacuum further decreases the efficiency of the disc filter.

In essence, the problem is circular. The high freeness of the fiber suspension leads to the filtrate being removed from the suspension at a greater rate than the fiber which, in turn, thickens the suspension. The thickened suspension causes mechanical scraping against the fiber mat on the filter element locally thinning (or removing) the fiber mat and allowing air to penetrate through the mat. The thinning of the mat allows more filtrate to pass through the mat and be removed from the suspension, further thickening the suspension and decreasing the vacuum of the filter element. The thickened suspension and decreased vacuum of the filter element accelerates the thinning and premature removal of the mat by mechanical scraping. The end result is an overall decrease in the efficiency of the disc filter.

Disclosed herein are embodiments of disc filters which include injectors for introducing a secondary flow of liquid into the disc filter thereby mitigating the aforementioned effects. The liquid may include, for example and without limitation, fiber suspension, a diluent such as water, or combinations thereof.

Figure 2:
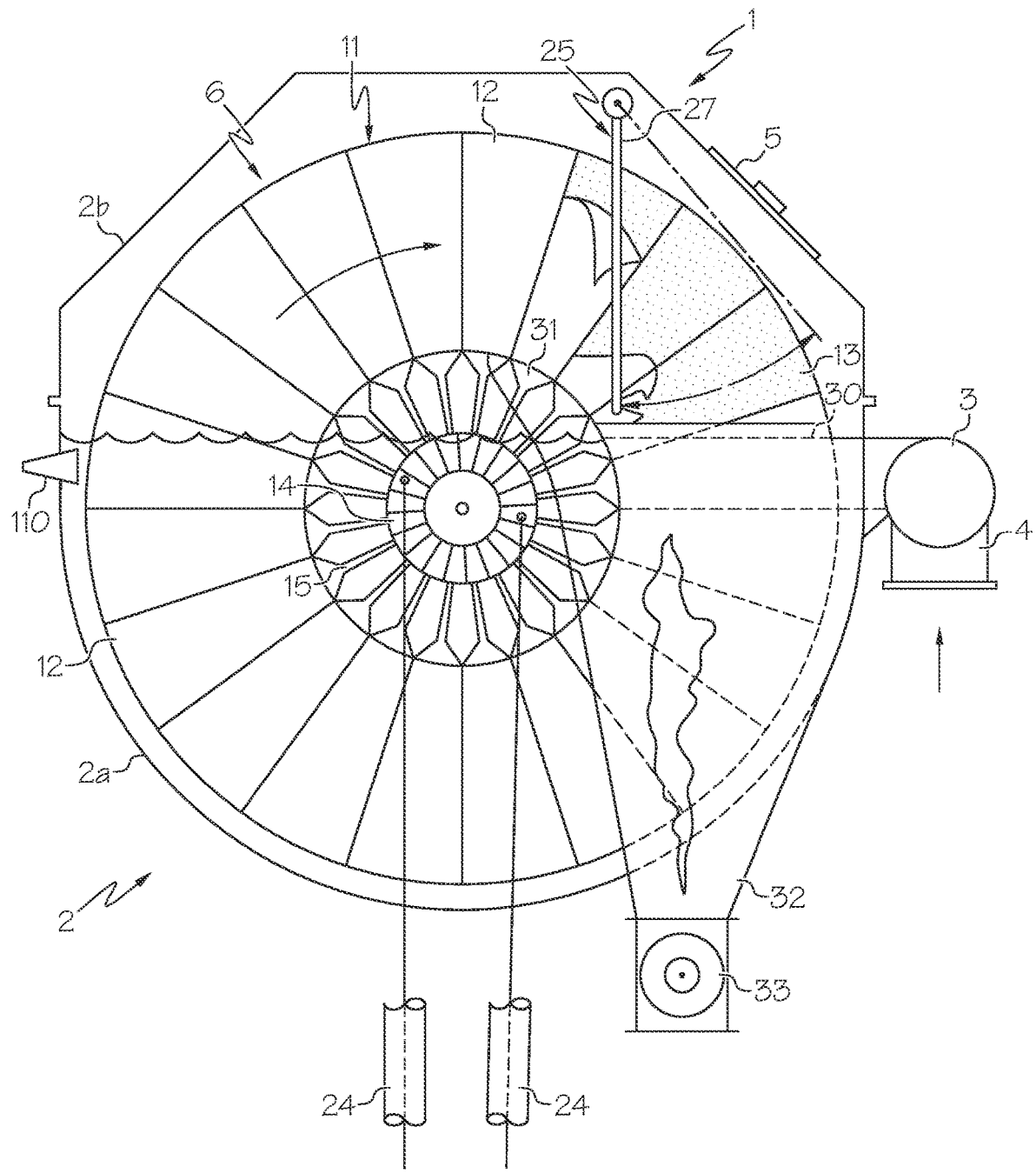
FIG. 2 is a cross section of the disc filter of FIG. 1 along the line A-A including an injector according to one or more embodiments shown and described herein.
Figure 5:
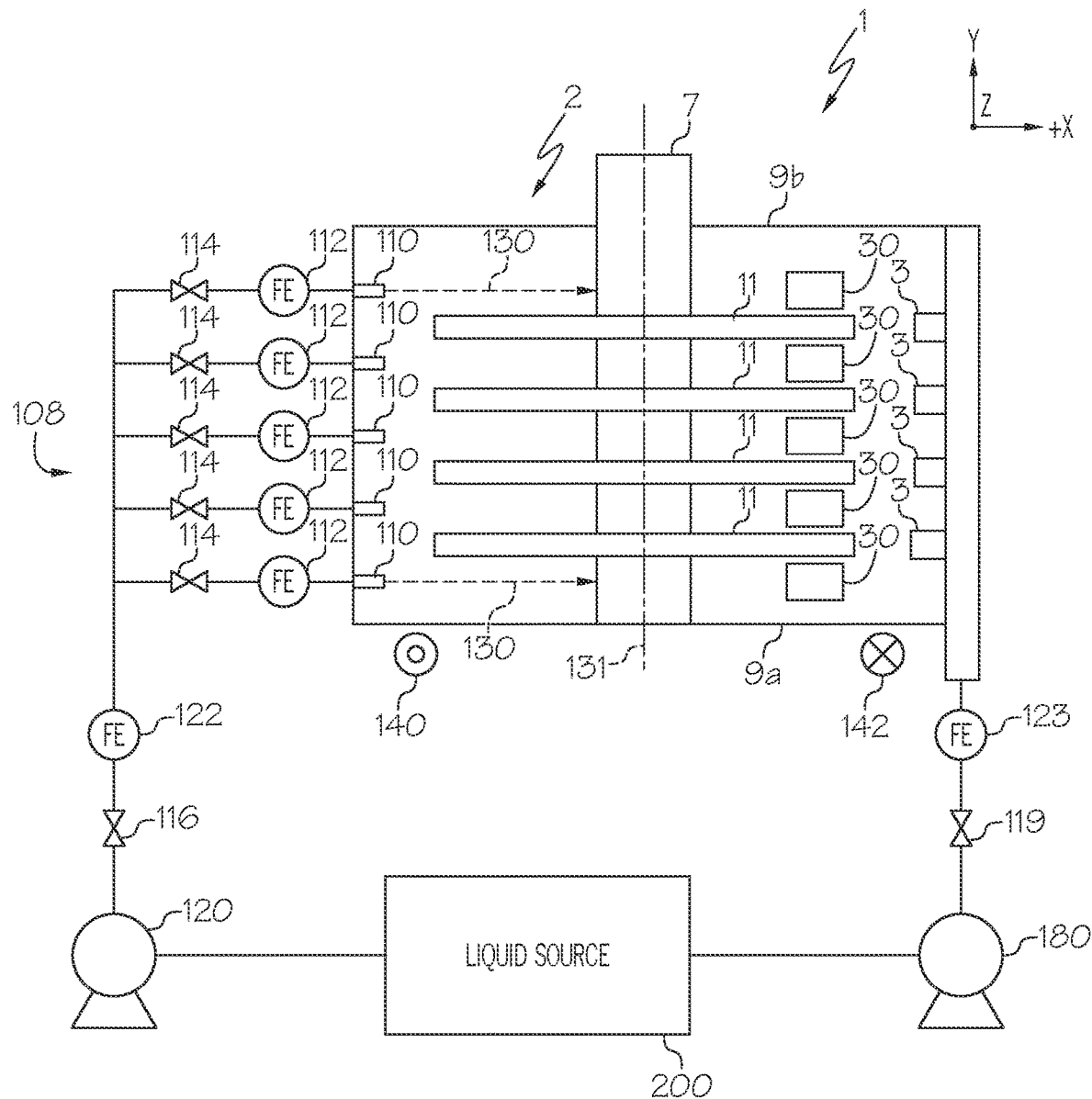
FIG. 5 schematically depicts a top view of a disc filter comprising a plurality of injectors according to one or more embodiments shown and described herein.

Specifically referring to FIGS. 1 and 2, one embodiment of a disc filter 1 is schematically depicted. In this embodiment, the disc filters 1 generally comprise a vessel 2 having an inlet 3 for introducing a cellulose fiber suspension into the vessel. The inlet 3 is connected to a conduit 4, through which the suspension is supplied to the inlet 3 (such as by a primary pump 180 as shown in FIG. 5). The vessel 2 comprises a lower part 2a and an upper part 2b connected to the lower part. The lower part 2a has a generally u-shaped configuration and is closed at the top by the upper part 2b, which forms a hood over the lower part. The upper and lower parts 2a, 2b together generally define an inner space of the vessel. In the illustrated aspect, the inner space of the vessel is accessible through a hatch 5 in the upper part 2b of the vessel.

The disc filter further comprises a rotor unit 6 located in the inner space of the vessel 2. The rotor unit 6 comprises a rotor shaft 7, which is rotatably mounted to the vessel 2 and extends across the inner space of the vessel. In the illustrated example, the rotor shaft 7 is rotatably mounted to the lower part 2a of the vessel through a first bearing 8a arranged at a first end of the rotor shaft and a second bearing 8b arranged at the other end of the rotor shaft. The rotor shaft 7 extends through sealed openings in the gable walls 9a, 9b of the vessel 2 and is rotated by means of a driving device 10, for instance in the form of a driving motor, which is connected to the rotor shaft 7.

The rotor unit 6 also comprises and number of disc-shaped filter elements 11 carried by the rotor shaft 7 in order to rotate together with the rotor shaft while being partly immersed in the suspension received in the vessel 2. In the illustrated example, the rotor unit 6 is provided with four such filter elements 11. However, it should be understood that the disc filter 1 may contain fewer than 4 filter elements or, alternatively greater than 4 filter elements. Each filter element 11 extends at an angle, preferably perpendicularly, to the longitudinal axis of the rotor shaft 7. In the embodiments described herein, the longitudinal axis coincides with the axis of rotation of the rotor unit 6. Furthermore, each filter element 11 extends in an annular configuration about the rotor shaft 7 and is divided into several filter sectors 12 distributed about the rotor shaft. The filter sectors 12 of an individual filter element 11 are mutually separated by means of radially oriented partitions extending between the opposite lateral surfaces of the filter element. As shown, the filter sectors are separated by radially oriented partitions. However, it should be understood that the partitions can be arranged in a variety of positions other than radial, depending on cost factors and other desirable structurally equivalent orientations. As shown, each filter element 11 is provided with an external filtering lining 13 (illustrated by the screen pattern in FIG. 2) on its opposite lateral surfaces and internal flow channels (not shown), which communicate with filtrate channels 14 in the rotor shaft 7 in order to convey filtrate that passes through the filtering lining 13 to said filtrate channels 14.

It is noted that a variety of equivalent filtering lining dispositions may be used in addition to the external dispositions shown in the drawings.

As illustrated in FIG. 2, each individual filter sector 12 comprises a conduit section 15 for transferring the filtrate, i.e. the water filtered out of the suspension in the vessel 2, from the filter sector 12 in question into an associated filtrate channel 14 in the rotor shaft 7 through an opening provided in the envelop surface of the rotor shaft between the conduit section 15 and the filtrate channel 14.

The filtrate channels 14 extend in the axial direction of the rotor shaft 7. These filtrate channels 14 may be formed as sector shaped spaces mutually separated by means of radially oriented partition walls extending along the rotor shaft 7. The filtrate channels 14 are delimited in the radial direction inwards by a tubular core 17 of the rotor shaft 7. The tubular core 17 may have a varying diameter along the length of the rotor shaft 7, as illustrated in FIG. 1, with the smallest diameter at the end of the tubular core which is located at that end of the rotor shaft 7 where the filtrate passes out of the rotor shaft 7 in the axial direction thereof. In the illustrated example, two outlets 20, 21 are provided for the filtrate. A first outlet 20 is intended for a pre-filtrate (cloudy filtrate), whereas the other outlet 21 is intended for a clear filtrate. At least the clear filtrate outlet 21 and possibly also the pre-filtrate outlet 20 may be connected to a fall tube 24 intended to establish a vacuum in a suction head 22. This suction head 22 communicates with the filtrate channels 14 in the rotor shaft 7 through a filtrate valve 23. When the rotor shaft 7 rotates in relation to the filtrate valve 23 and the suction head 22, the filtrate valve 23 will bring the respective filtrate channel 14 in communication with the pre-filtrate outlet 20 or the clear filtrate outlet 21 depending on the prevailing rotational position of the rotor shaft 7.

As shown in FIG. 2, the disc filter 1 further comprises at least one injector 110 which extends through a wall of the vessel 2. As will be described in further detail herein, the at least one injector 110 is used to introduce a secondary flow of liquid into the vessel 2 to promote dilution, agitation, and mixing of the fiber suspension in the vessel, thereby reducing the thickening of the fiber suspension and improving the efficiency of the disc filter 1. In embodiments the secondary flow of liquid may comprise water, fiber suspension, or the like.

Still referring to FIG. 2, the disc filter 1 may also be provided with loosening members 25 for loosening fiber material that has been filtered out of the suspension in the vessel 2 and deposited as a fiber mat on the filtering lining 13 of the respective filter element 11. In the illustrated example, these loosening members 25 consist of spray nozzles, which are configured to loosen the fiber material deposited on the filtering lining of the respective filter element 11 successively from one filter sector 12 at a time as the filter sectors of the filter element rotate past loosening members 25 arranged on the opposite sides of the filter element 11 and come within reach of the jets of water or any other suitable fluid emitted from these loosening members 25.

The disc filter 1 is also provided with cleaning members 26 for cleaning the filtering lining 13 of the respective filter element 11 with a flushing liquid emitted from the cleaning members. The cleaning members 26 consist of, for example, spray nozzles, which are arranged on the opposite sides of the respective filter element 11 and configured to emit jets of water or any other suitable flushing liquid towards the filtering lining 13 on the opposite sides of respective the filter element. The cleaning members 26 are suitably mounted on pivotable carriers 27, which are configured to pivot to and fro in order to allow the cleaning members 26 to sweep over the filtering lining 13 of the respective filter element 11 during the rotation of the rotor unit 6. The carriers 27 are pivoted by a driving device 29, for instance in the form of a driving motor. In the illustrated example, the loosening members 25 are connected to the carriers 27 in order to make the loosening members 25 pivot together with the cleaning members 26. However, the loosening members 25 may alternatively be stationary. The cleaning members 26 are located after the loosening members 25 as seen in the rotational direction of the filter elements 11. Thus the respective filter sector 12 of a filter element 11 will rotate past the loosening members 25 and thereafter past the cleaning members 26 during the rotation of the filter element.

The disc filter 1 comprises a plurality of receiver chutes 30, each of which is provided with an inlet opening at the upper end for receiving the fiber mat loosened from the filtering lining 13 of the adjacent filter elements 11. Each filter element 11 has a first receiver chute 30 located alongside of a part of the filtering lining 13 on a first side of the filter element and another receiver chute 30 located alongside of a part of the filtering lining 13 on the opposite side of the filter element. One receiver chute 30 is located in the space between each pair of adjacent filter elements 11 and in the space between the respective outermost filter element 11 on the rotor shaft 7 and the adjacent gable wall 9a, 9b of the vessel 2. In the embodiment depicted in FIGS. 1-3, the receiver chutes 30 are located in the part of the vessel 2 where the filter sectors 12, during the rotation of the rotor unit 6, are rotated down into the suspension from a position above the suspension, i.e. on the side of the rotor shaft 7 where the filter sectors 12 are rotated downwards after having been liberated from the fiber material and cleaned by the cleaning members 26. That is, the receiver chutes are located on the side of the vessel 2 where a primary component of the angular velocity of the filter elements is in the downward vertical direction. However, in alternative embodiments (not shown), the receiver chutes 30 are located in the part of the vessel 2 where the filter sectors 12, during the rotation of the rotor unit 6, are rotated out of the suspension from a position below the suspension, i.e. on the side of the rotor shaft 7 where the filter sectors 12 are rotated upwards. That is, in alternative embodiments, the receiver chutes are located on the side of the vessel 2 where a primary component of the angular velocity of the filter elements is in the upward vertical direction. The inlet opening at the upper end of each receiver chute 30 is located above a horizontal plane extending through the longitudinal axis of the rotor shaft 7, and the lateral edges of said inlet opening extend closely to the filtering linings 13 of the adjacent filter elements 11 in order to efficiently catch the fiber mat loosened from the filter sectors 12 of these filter elements. The lateral walls of each receiver chute 30 diverge at the upper part of the receiver chute close to the inlet opening of the receiver chute, as illustrated in FIG. 1. Furthermore, each receiver chute 30 is provided with a part 31 at its upper end which is curved inwards into the area above the rotor shaft 7, as illustrated in FIG. 2, so as to allow the inlet opening of the receiver chute to extend into this area.

The loosening members 25 and the cleaning members 26 are located above the receiver chutes 30 on the side of the rotor shaft 7 where the filter sectors 12 are rotated downwards towards the surface of the suspension in the vessel 2. The cleaning members 26 are configured to flush the fiber mat loosened by the loosening members 25 down into the receiver chutes 30 by means of the flushing liquid emitted from the cleaning members. The receiver chutes 30 are configured to receive said fiber mat together with flushing liquid from the cleaning members 26 to thereby allow the fiber mat to be diluted in the receiver chutes 30 to a desired dry content by means of this flushing liquid. At the lower end 32, each receiver chute 30 is connected to a conveyor 33, which is configured to pick up the fiber mat falling down through the receiver chutes and transfer this fiber mat to an outlet 34, from which the fiber mat is passed on for further processing. In the illustrated example, said conveyor 33 is a screw conveyor, which extends in parallel with the rotor shaft 7 and which is rotated by means of a driving device 35, for instance in the form of a driving motor.

When the filter elements 11 are rotated, the filter sectors 12 will be submerged into the suspension in the vessel 2 in the spaces 36 between the receiver chutes 30 and then move through the suspension to the opposite side of the rotor shaft 7, where the filter sectors 12 are rotated upwards out of the suspension. As the filter sectors 12 move through the suspension, water is sucked from the suspension, through the filtering lining 13 on the filter sectors 12 and into the flow channels inside the filter sectors, while a fiber is deposited as a fiber mat on the external surfaces of said filtering lining. The filtrate comprising the water then flows from the flow channels to the filtrate channels 14 in the rotor shaft 7 through the conduit sections 15 and is discharged from the vessel 2 through the suction head 22 and one of the filtrate outlets 20, 21. When the filter sectors 12 have been rotated upwards out of the suspension, the continued suction through the filtrate channels 14 in the rotor shaft 7 and the flow channels in the filter sectors creates an air flow through the fiber material deposited on the filtering lining 13 of the filter sectors and further on through the flow channels and into the filtrate channels 14. The fiber material deposited on the filtering lining 13 will be subjected to drying by this air flow. After having rotated past the angular position in which the filter sectors 12 are orientated vertically upwards, the filter sectors 12 successively rotate past the loosening members 25, which loosen the fiber mat from the filtering lining 13 of the filter sectors 12 by means of fluid jets directed towards the opposite lateral surfaces of the respective filter sector 12. Upon continued rotation of the rotor unit 6 the filter sectors 12 then rotate past the cleaning members 26, which clean the filtering lining 13 of the filter sectors 12 by means of flushing liquid sprayed towards the opposite lateral surfaces of the respective filter sector 12. The fiber mat loosened from the filtering lining 13 of the filter sectors falls down into the receiver chutes 30 together with flushing liquid from the cleaning members 26. At the bottom of the receiver chutes 30, the fiber mat is picked up by the conveyor 33 and passed on for further processing. After having rotated past the cleaning members 26 and the upper ends of the receiver chutes 30, the filter sectors 12 are rotated down into the suspension again for a new filtering cycle.

The inlet 3 of the vessel 2 preferably comprises several inlet openings (not shown in FIGS. 1 and 2) located in the part of the vessel 2 where the filter sectors 12, during the rotation of the rotor unit 6, are rotated down into the suspension in the vessel from a position above the suspension, the inlet openings being configured to introduce the suspension into the spaces 36 between the receiver chutes 30. Said inlet 3 and its inlet openings are configured to make the suspension flow into the vessel 2 in a direction conforming to the rotational direction of the filter elements 11.

Figure 3:
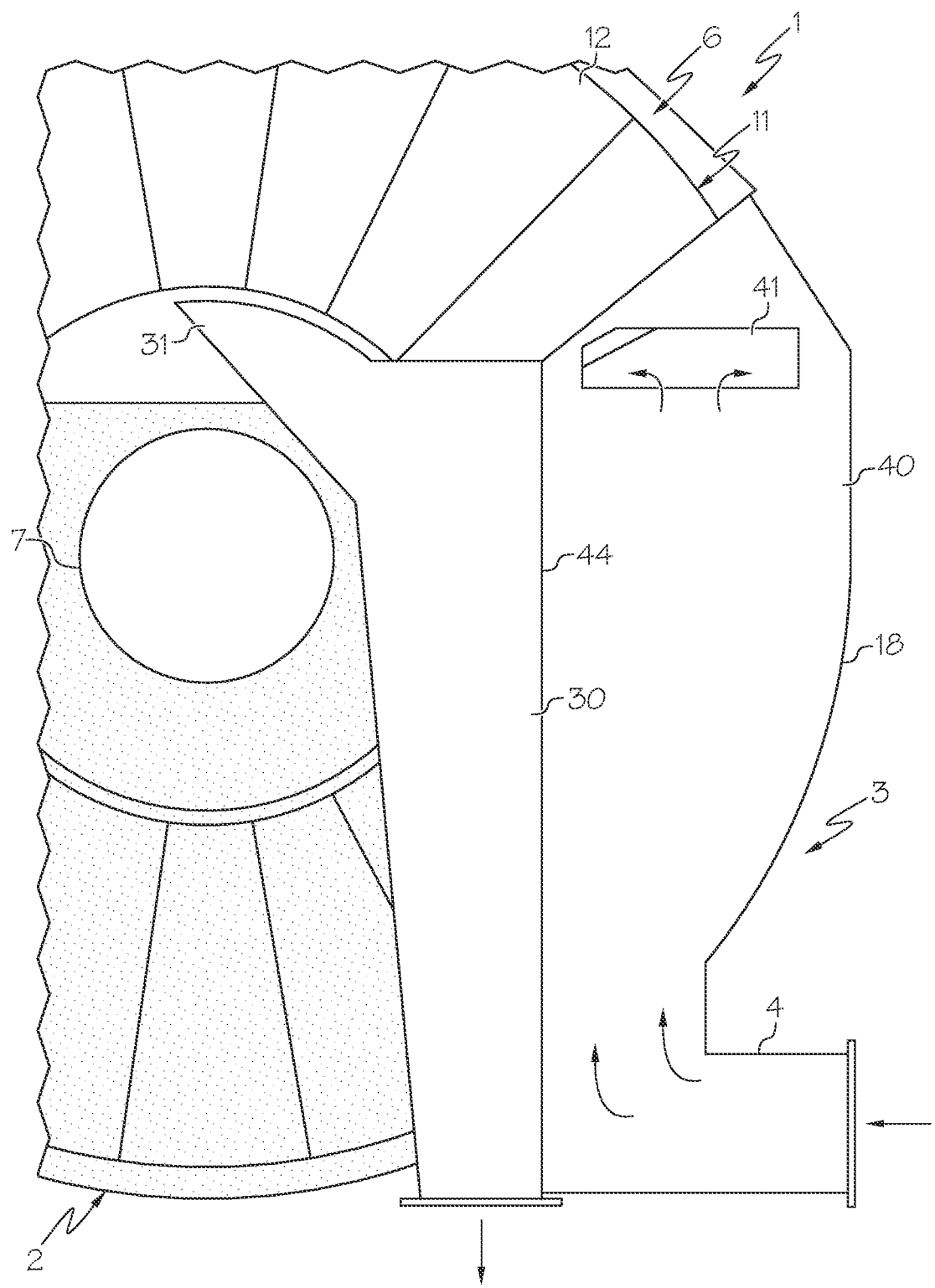
FIG. 3 schematically depicts a portion of a filter element and receiving chute according to one or more embodiments shown and described herein.

In the embodiment illustrated in FIG. 3, the inlet 3 of the vessel 2 comprises several inlet channels 40, which are located in the vessel 2 in the part of the vessel where the filter sectors 12, during the rotation of the rotor unit 6, are rotated down into the suspension from a position above the suspension. Each inlet channel 40 extends vertically alongside of one of the receiver chutes 30 of the disc filter with the inlet channel 40 located between the receiver chute and an adjacent part of the peripheral wall 18 of the vessel 2. The respective inlet channel 40 is separated from the adjacent receiver chute 30 by a partition wall 44. The lateral walls 37 of the respective receiver chute 30 are flush with the lateral walls 42 of the associated inlet channel 40. The inlet channels 40 are connected to a conduit 4, through which the suspension is supplied to the inlet channels 40. Inlet openings 41 are located at the upper part of the inlet channels 40 to allow the suspension to flow from the inlet channels and into the spaces between the receiver chutes 30 through these inlet openings 41. These inlet openings 41 are provided in the opposite lateral walls 42 of the respective inlet channel above the surface of the suspension in the vessel. The upper end of each inlet channel 40 is covered by a slanting roof 43 in order to prevent flushing liquid from the cleaning members and loosened fiber mat from falling into the inlet channel.

Figure 4:
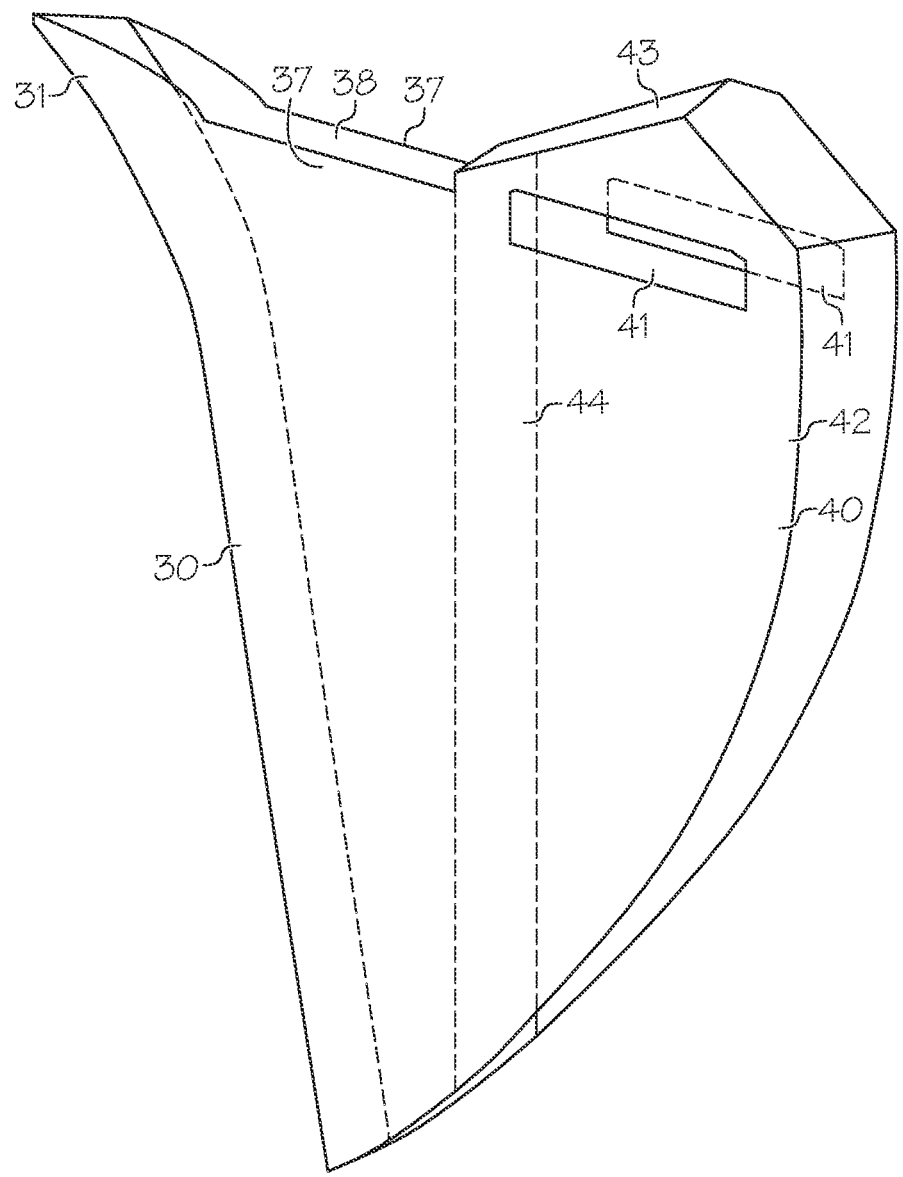
FIG. 4 schematically depicts a perspective view of a receiver chute and an adjacent inlet channel of the disc filter according to one or more embodiments shown and described herein.

Each receiver chute 30 is open at the top, as illustrated in FIG. 4, in order to provide an inlet opening 38 for receiving the fiber mat loosened from the filtering lining of the adjacent filter elements 11 together with flushing liquid from the cleaning members located above the receiver chute. In the embodiment illustrated in FIGS. 3 and 4, each receiver chute 30 is provided with a part 31 at its upper end which is curved inwards into the area above the rotor shaft 7 so to allow the inlet opening 38 of the receiver chute to extend into this area. However, it should be understood that receiver chutes of other configurations are contemplated and possible.

Figure 6:
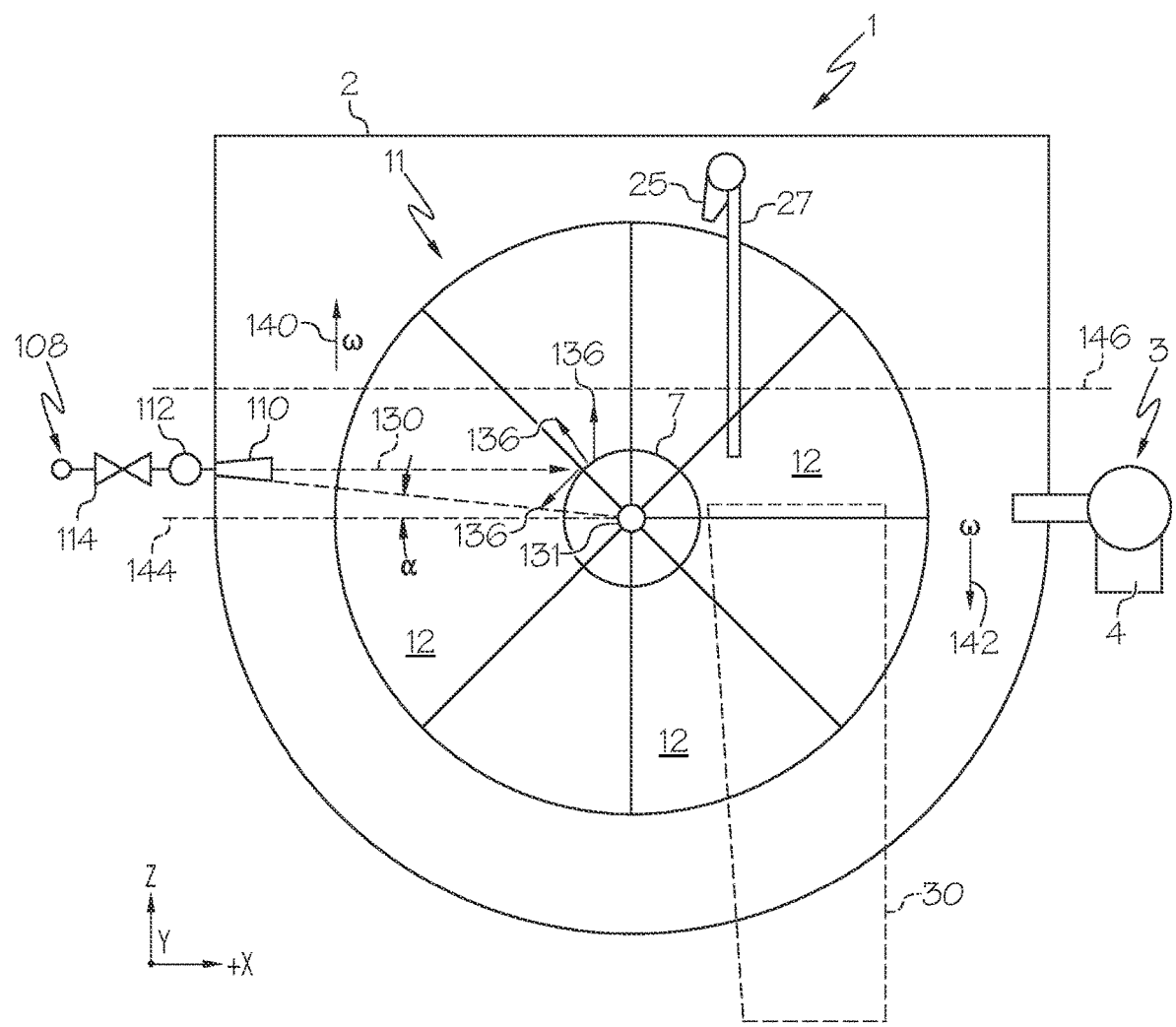
FIG. 6 schematically depicts a cross section of the disc filter of FIG. 5 illustrating the positioning of the injectors relative to the filter element and the horizontal plane according to one or more embodiments shown and described herein.

Referring now to FIGS. 5 and 6 and as noted herein, the embodiments of the disc filter 1 described herein further include at least one injector 110. For example, the disc filter 1 may include a plurality of injectors 110 located adjacent to each side of each filter element 11 in the space between each pair of adjacent filter elements 11 and in the space between the respective outermost filter elements 11 and the adjacent gable wall 9a, 9b of the vessel 2. Accordingly, in the embodiment depicted in FIG. 5, the disc filter 1 comprises five injectors 110. However, it should be understood that the number of injectors 110 may be greater than 5 or less than 5 depending on the number of filter elements 11 in the disc filter 1.

In general, the injectors 110 are positioned to direct a secondary flow of liquid, such as water, fiber suspension, or the like, into the vessel. In embodiments, the flow of liquid may be directed onto the rotor shaft 7. In embodiments, the injectors 110 may be shaped and positioned to minimize or mitigate contact between the secondary flow of liquid and the surfaces of the filter elements 11. In embodiments, the injectors 110 may be shaped and positioned to provide a secondary flow of liquid at a sufficient pressure such that the at least a portion of the flow contacts the rotor shaft 7. In these embodiments, the primary flow vector 130 of each injector is orthogonal to the shaft axis of rotation 131 of the rotor shaft 7. More specifically, in embodiments, the rotor shaft 7 comprises a shaft axis of rotation 131 that lies in a shaft plane 144 which is a horizontal plane (i.e., a plane parallel to the X-Y plane of the coordinate axes depicted in the figures). The primary flow vector 130 of each injector 110 is generally orthogonal to the shaft axis. In some embodiments, the primary flow vector 130 of each injector 110 may optionally be generally parallel to (or even co-planar with) the shaft plane 144. In some other embodiments, the injectors 110 are oriented in the wall of the vessel 2 such that the primary flow vectors 130 of the injectors 110 are at a non-zero angle with respect to the shaft plane 144. In some embodiments, the primary flow vectors 130 of at least some of the injectors 110 intersect with the shaft axis of rotation 131. In some other embodiments, the primary flow vectors 130 of at least some of the injectors 110 are spaced apart from the shaft axis of rotation in the positive or negative vertical direction (i.e., the positive Z direction or the negative Z direction of the coordinate axes depicted in the figures). In embodiments, the injectors 110 are positioned in the wall of the vessel 2 at a location proximate the filter elements 11 and on a side of the vessel 2 opposite the inlets 3. In the embodiment depicted in FIGS. 5 and 6, the injectors 110 are positioned in the wall of the vessel 2 at a location proximate the filter elements 11 where the primary component of the angular velocity vector ω (indicated by arrows/symbols 140 and 142) of the filter elements 11 is in the positive vertical direction while the inlets 3 are located in the wall of the vessel 2 at a location proximate the filter elements 11 where the primary component of the angular velocity vector ω of the filter elements 11 is in the negative vertical direction (i.e., the negative Z direction of the coordinate axes depicted in the figures). However, it should be understood that other embodiments are contemplated and possible. For example, in an alternative embodiment (not depicted), the injectors 110 are positioned in the wall of the vessel 2 at a location proximate the filter elements 11 where the primary component of the angular velocity vector ω of the filter elements 11 is in the negative vertical direction while the inlets 3 are located in the wall of the vessel 2 at a location proximate the filter elements 11 where the primary component of the angular velocity vector ω of the filter elements 11 is in the positive vertical direction.

In the embodiments described herein, the injectors 110 are located in the wall of the vessel 2 at a vertical elevation that is above (i.e., in the positive Z direction of the coordinate axes depicted in the figures) the shaft axis of rotation 131, below (i.e., in the negative Z direction of the coordinate axes depicted in the figures) the shaft axis of rotation 131, or at the same vertical elevation as the shaft axis of rotation 131. The vertical elevation is defined herein by an injector elevation angle $\alpha_I$ relative to the shaft plane 144 as shown in FIG. 6. It should be noted that the injector elevation angle $\alpha_I$ of the injectors 110, as used herein, refers to the position of the injectors 110 along the wall of the vessel 2 relative to the shaft plane 144, not the angular orientation of the injectors 110 about a specific axis. In the embodiments described herein, the injector elevation angle $\alpha_I$ is greater than −44 degrees and less than or equal to +22 degrees relative to the shaft plane 144. In some embodiments, the injector elevation angle $\alpha_I$ is greater than −22 degrees and less than or equal to +22 degrees relative to the shaft plane 144. In some embodiments, the injector elevation angle $\alpha_I$ is greater than −15 degrees and less than or equal to +15 degrees relative to the shaft plane 144. In some embodiments, the injector elevation angle $\alpha_I$ is greater than −10 degrees and less than or equal to +10 degrees relative to the shaft plane 144. In some of these embodiments, the injector elevation angle $\alpha_I$ is a non-zero angle relative to the shaft plane 144. For example, in some embodiments, the injector elevation angle $\alpha_I$ is greater than 0 degrees and less than or equal to +22 degrees relative to the shaft plane 144 or less than 0 degrees and greater than or equal to −44 degrees. In some embodiments, the injector elevation angle $\alpha_I$ is greater than 0 degrees and less than or equal to +22 degrees relative to the shaft plane 144 or less than 0 degrees and greater than or equal to −22 degrees. In some other embodiments, the injector elevation angle $\alpha_I$ is 0 degrees relative to the shaft plane 144. In these embodiments, the primary flow vectors 130 of the injectors may lie in the shaft plane 144 or, alternatively, in a plane parallel to the shaft plane 144. In the embodiments described herein, the injectors 110 are generally located along the wall of the vessel 2 below the fill level 146 of the fiber suspension in the vessel 2, as depicted in FIG. 6.

Figure 7:
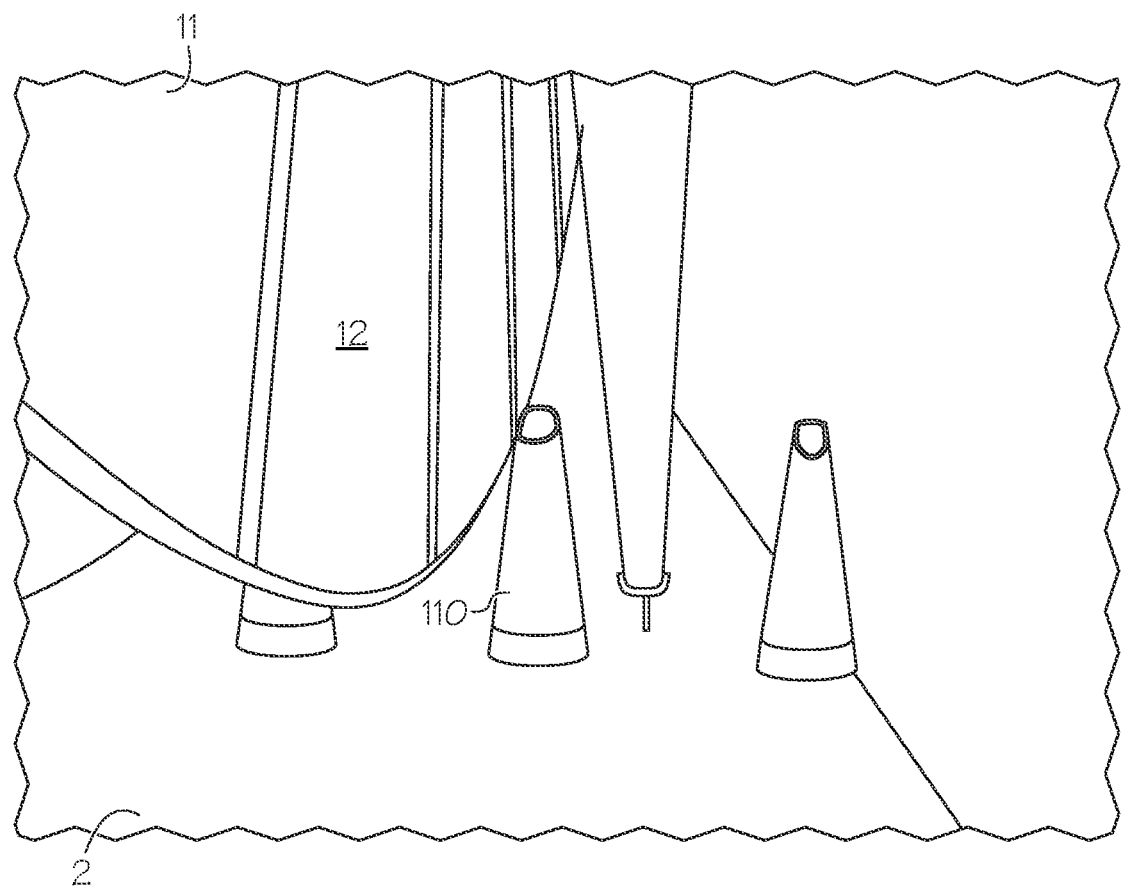
FIG. 7 schematically depicts injectors positioned along a wall of the vessel according to one or more embodiments shown and described herein.
Figure 8:
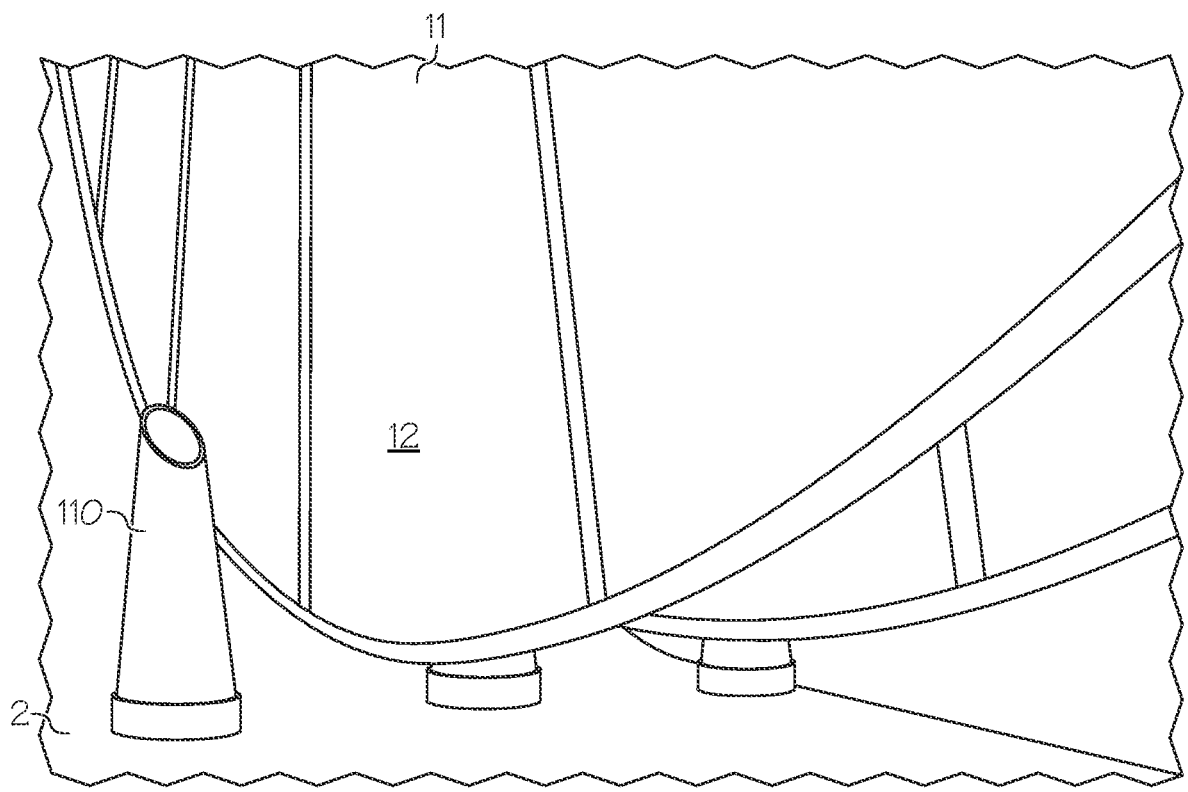
FIG. 8 schematically depicts injectors positioned along a wall of the vessel according to one or more embodiments shown and described herein.

In embodiments, the outlets of the injectors 110 are disposed between the outer radius of the filter elements 11 and the wall of the vessel 2, as depicted in FIGS. 5 and 6. In some other embodiments, the outlets of the injectors 110 are disposed between the outer radius of the filter elements 11 and the rotor shaft 7, as depicted in FIGS. 7 and 8.

Figure 9:
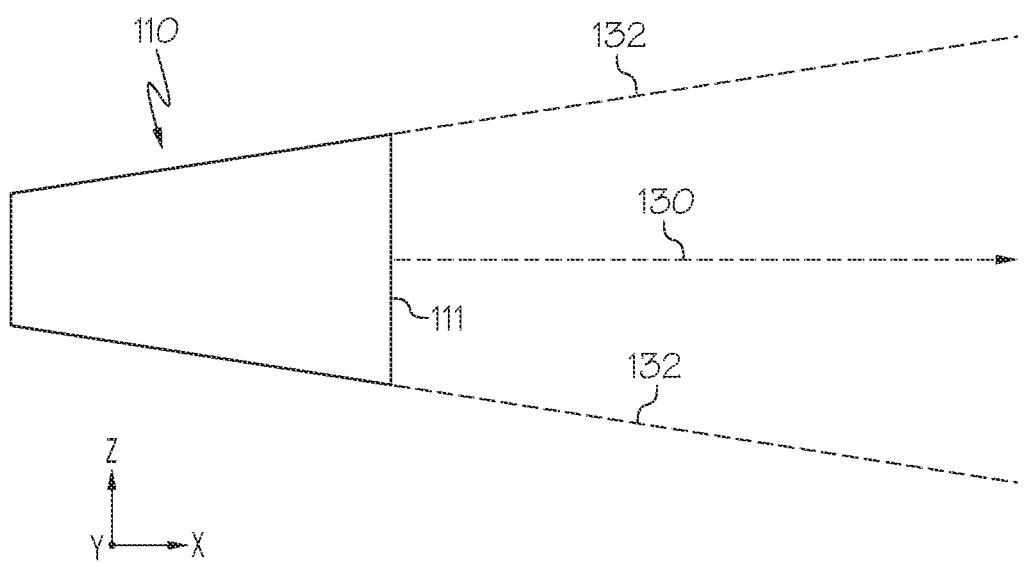
FIG. 9 schematically depicts a flow cone of an injector relative to the primary flow vector of the injector.

Referring now to FIGS. 5 and 9, in some embodiments the injectors 110, specifically the outlets 111 of the injectors 110, are shaped to minimize or mitigate contact between the secondary flow of liquid from the injectors 110 and the surfaces of the filter elements 11 while, optionally, also providing a secondary flow of liquid at a sufficient pressure such that the flow contacts the rotor shaft 7. In particular embodiments, the outlets 111 of the injectors 110 are shaped such that the flow of liquid from the injectors (as indicated by the flow cone 132 in FIG. 9) diverges from the primary flow vector 130 of the injector 110 in primarily +/− vertical directions while minimizing lateral divergence of the secondary flow from the primary flow vector 130 (i.e., divergence in the +/−Y direction of the coordinate axes depicted in the figures). That is, the outlets 111 of the injectors are shaped to create a vertical fan of liquid that is directed between adjacent filter elements 11 and, in some embodiments, onto the rotor shaft 7 with minimal contact with the surfaces of the filter elements 11. Flow injectors with this configuration aid in minimizing the disruption of the fiber mat on the surfaces of the filter elements 11 prior to removal of the fiber mat with the cleaning members 26.

Figure 10:
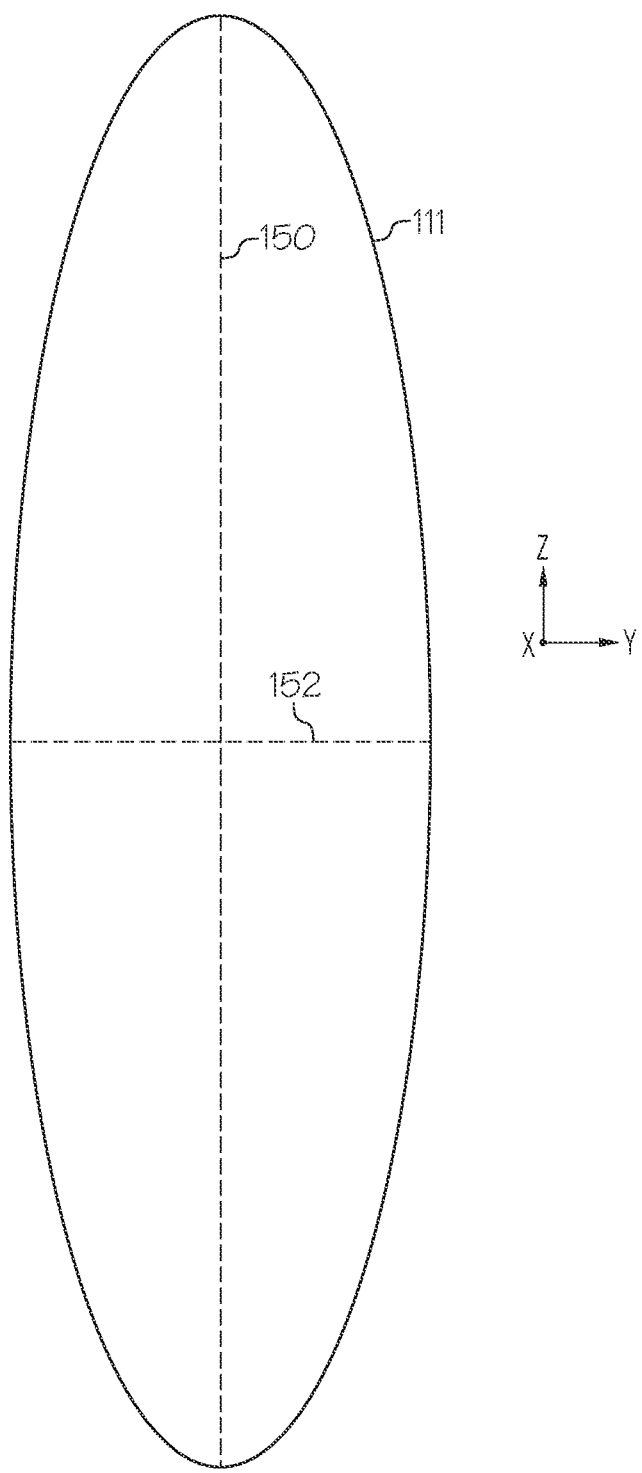
FIG. 10 schematically depicts one embodiment of an outlet of an injector.

Referring now to FIG. 10, in embodiments, the vertical fan of liquid is created by constructing the outlets 111 of the injectors 110 with a major axis 150 in the +/- vertical direction (i.e., a direction parallel to the +/-Z direction of the coordinate axes depicted in the figures) and a minor axis 152 in the lateral direction (i.e., a direction parallel to the +/-Y direction of the coordinate axes depicted in the figures) such that the length of the major axis 150 is greater than the length of the minor axis 152. Suitable geometries for the outlets 111 of the injectors include, without limitation, ellipses, rectangles, ovals, ovoids, and the like.

Figure 11:
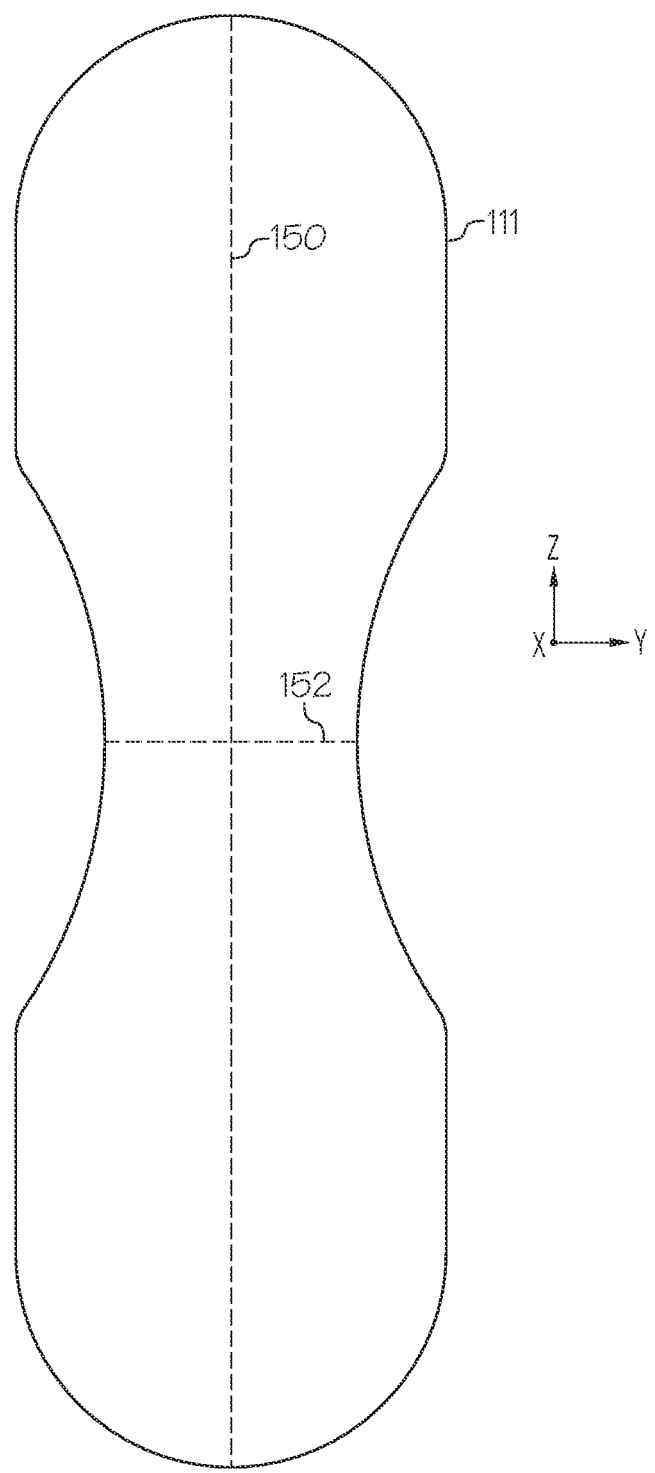
FIG. 11 schematically depicts one embodiment of an outlet of an injector.
Figure 12:
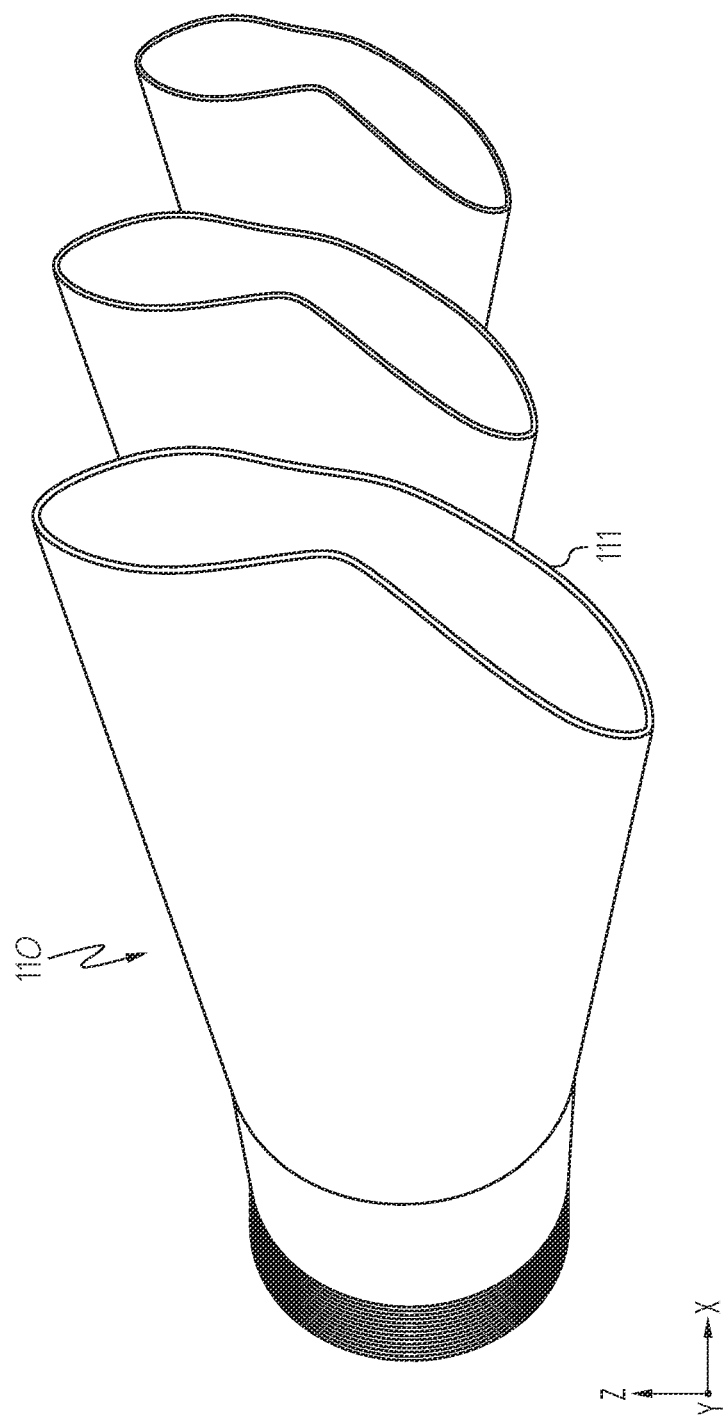
FIG. 12 schematically depicts one embodiment of injectors.

Referring now to FIG. 11, in some embodiments, a width of the outlets 111 (i.e., the dimension of the outlet in the +/-Y direction) varies along the major axis 150. For example, in one particular embodiment, the width of the outlet 111 varies along the major axis such that the outlet 111 has a "dog bone" cross section as depicted in FIG. 11. A specific embodiment of injectors 110 having outlets 111 in which the width varies along the major axis is depicted in FIG. 12.

While the outlets 111 of the injectors are described herein as having a major axis 150 and a minor axis 152 wherein the length of the major axis 150 is greater than the length of the minor axis, it should be understood that other embodiments are contemplated and possible. For example, in alternative embodiments (not shown), the outlets may be circular, square, octagonal, or the like. It should be understood that outlets having these configurations may also be used to create a secondary flow of liquid with sufficient pressure to contact the rotor shaft without disrupting the fiber mat deposited on the filter elements 11.

Referring again to FIGS. 5 and 6, in the embodiments of the disc filters 1 described herein, the incorporation of injectors 110 at the described locations assists in mitigating thickening of the fiber suspension at areas of the vessel 2 most prone to thickening. In particular, the introduction of a secondary flow of liquid aids in diluting (i.e., thinning) the fiber suspension in the tank, thereby reducing thickening. Moreover, it has been unexpectedly found that providing a secondary flow of liquid into the vessel 2 such that the secondary flow contacts the rotor shaft 7 causes sufficient agitation and mixing in the vessel opposite the inlets 3 to further reduce or mitigate thickening of the fiber suspension in the vessel. In particular, when the secondary flow of liquid (indicated in FIG. 6 by primary flow vector 130) contacts the rotor shaft 7, the secondary flow is redirected and scattered in multiple directions (i.e., vertically and directions between vertical and horizontal) as indicated by scattering vectors 136 in FIG. 6. This redirection and scattering of the secondary flow by the rotor shaft 7 creates agitation and mixing of the fiber suspension resident in the vessel 2 which assists in both diluting the suspension resident in the vessel and creating a more homogenous mix of filtrate and fiber, thereby reducing or even mitigating thickening and the resultant effect of mechanical scraping against the filter mat deposited on the filter elements 11. Advantageously, it has been found that the agitation and mixing due to the secondary flow of liquid directed onto the rotor shaft does not disrupt the deposition of the fiber mat on the filter elements.

Still referring to FIGS. 5 and 6, the disc filter 1 may be configured to provide a specific flow ratio of liquid between the inlets 3 and the injectors 110. In these embodiments, the liquid may be, for example, fiber suspension. This may be accomplished with various combinations of flow control components (e.g., pumps, valves, flow meters, and the like). For example, in some embodiments, each injector 110 is fluidly coupled to a feed manifold 108 which, in turn, is coupled to a pump 120 which provides a flow of liquid from a liquid source 200 (e.g., a storage tank or the like) to the feed manifold 108. In embodiments, the liquid source 200 may also be coupled to a primary pump 180 which provides a flow of liquid to the inlets 3. In this embodiment, the liquid is fiber suspension and the liquid source 200 is a suspension source. However, it should be understood that, in alternative embodiments, the primary pump 180 may be coupled to a different liquid source. For example, in some embodiments (not depicted), the pump 120 may be coupled to a secondary liquid source (such as a secondary suspension source, a secondary water source, or the like) and the primary pump 180 may be coupled to a primary suspension source separate from the secondary liquid source. In yet other embodiments (not shown), a single pump (such as pump 120 or primary pump 180) is used to couple a single suspension source to both the feed manifold 108 and the inlets 103. In such embodiments, one or more valves may be used to regulate the flow and pressure of the fiber suspension to the feed manifold 108 and the inlets 103.

In embodiments, a secondary feed valve 116 may be disposed between the pump 120 and the feed manifold 108 to regulate the flow and pressure of liquid to the feed manifold 108, as depicted in FIG. 5. However, it should be understood that the secondary feed valve 116 is optional and is not included in some embodiments.

Similarly, in some embodiments, a primary feed valve 119 may be disposed between the primary pump 180 and inlets 3 to regulate the flow and pressure of liquid to the inlets 3, as depicted in FIG. 5. However, it should be understood that the primary feed valve 119 is optional and is not included in some embodiments.

In embodiments, the disc filter 1 may include a secondary feed flow meter 122 disposed between the pump 120 and the feed manifold 108. The secondary feed flow meter 122 may be used to monitor the flow rate and/or pressure of liquid supplied to the feed manifold 108 by the pump 120. However, it should be understood that the secondary feed flow meter 122 is optional and that in some embodiments the disc filter 1 is constructed without the secondary feed flow meter 122.

In embodiments, the disc filter 1 may include a primary feed flow meter 123 disposed between the primary pump 180 and the inlets 3. The primary feed flow meter 123 may be used to monitor the flow rate and/or pressure of the liquid supplied to the inlets 3 by the primary pump 180. However, it should be understood that the primary feed flow meter 123 is optional and that in some embodiments the disc filter 1 is constructed without the primary feed flow meter 123.

In embodiments of the disc filter 1 which include a secondary feed valve 116 and/or a primary feed valve 119, the feed valves may be manually operated while, in other embodiments, the feed valves 116, 119 are electrically or pneumatically operated such that the feed valves can be remotely actuated such as by a control system (not shown) or the like communicatively coupled to the feed valves. In such embodiments, the pump 120 and primary pump 180 may also be communicatively coupled to the control system such that the flow rate and pressure of liquid into and through the feed manifold 108 and inlets 3 can be remotely controlled and/or regulated. In embodiments in which the disc filter 1 includes a control system, the secondary feed flow meter 122 and the primary feed flow meter 123 may be communicatively coupled to the control system thereby enabling automated monitoring of the flow and/or pressure of liquid to and through the feed manifold 108 and inlets 3. In some of these embodiments, such as embodiments which include both secondary and primary feed flow meters 122, 123 and secondary and primary feed valves 116, 119, the control system may use the feed flow meters 122, 123 in conjunction with the feed valves 116, 119 and/or pumps 120, 180 to facilitate feedback control of the flow of liquid to and through the feed manifold 108 and inlets 3.

Still referring to FIGS. 5 and 6, in some embodiments, each of the injectors 110 is optionally coupled to the feed manifold 108 through an injector valve 114. The injector valves 114, when included, may be used to regulate and adjust the flow and pressure of liquid to and through each of the injectors from the feed manifold 108. For example, the injector valves 114 may be used to individually regulate the flow rate and pressure of liquid to and through each of the injectors 110. Accordingly, it should be understood that, in some embodiments, the flow and/or pressure of liquid through each of the injectors 110 may be individually regulated. In some embodiments, the injector valves 114 may be manually operated while, in other embodiments, the injector valves 114 are electrically or pneumatically operated such that the injector valves 114 can be remotely actuated by a control system (not shown) or the like communicatively coupled to the injector valves 114. In such embodiments, the pump 120 and primary pump 180 may also be communicatively coupled to the control system such that the flow rate and pressure of liquid into and through the injectors 110 can be remotely controlled and/or regulated.

While FIG. 5 schematically depicts the injectors 110 as being coupled to the feed manifold 108 with injector valves 114, it should be understood that the injector valves 114 are optional and, in some embodiments, the injectors 110 are coupled to the feed manifold 108 without the injector valves 114.

In some embodiments, each of the injectors 110 is optionally coupled to the feed manifold 108 with a flow meter 112. In embodiments in which the injectors 110 are coupled to the feed manifold 108 with injector valves 114, the flow meters 112 are positioned between the injector valves 114 and the injectors 110, as depicted in FIG. 5. The flow meters 112 may be used to monitor the flow and/or pressure of liquid from the feed manifold 108 to the injectors 110. In embodiments in which the disc filter 1 includes a control system, the flow meters 112 may be communicatively coupled to the control system thereby enabling automated monitoring of the flow and/or pressure of liquid to and through the injectors 110. In some of these embodiments, such as embodiments which include both flow meters 112 and/or injector valves 114, the control system may use the flow meters 112 in conjunction with the injector valves 114 and/or the pump 120 or primary pump 180 to facilitate feedback control of the flow and pressure of liquid through the injectors 110.

While FIG. 5 schematically depicts the injectors 110 as being coupled to the feed manifold 108 through flow meters 112, it should be understood that the flow meters 112 are optional and, in some embodiments, the injectors 110 are coupled to the feed manifold 108 without the flow meters 112.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A disc filter for dewatering a fiber suspension, the disc filter comprising:
   a vessel comprising an inlet positioned in a first wall of the vessel, the inlet introducing the fiber suspension into the vessel;
   a rotor shaft comprising a shaft axis of rotation;
   at least one filter element coupled to the rotor shaft such that the at least one filter element rotates with the rotor shaft about the shaft axis of rotation; and
   at least one injector positioned in a second wall of the vessel, wherein:
   the at least one injector is positioned in a side of the vessel opposite from the inlet;
   the at least one injector is configured to introduce a secondary flow of liquid into the vessel; and
   the secondary flow of liquid has a primary flow vector towards the shaft axis of rotation.

2. The disc filter of claim 1, wherein:
   a primary component of an angular velocity vector $\omega$ of the at least one filter element is in a positive vertical direction proximate the at least one injector; and
   the primary component of the angular velocity vector $\omega$ of the at least one filter element is in a negative vertical direction proximate the inlet.

3. The disc filter of claim 1, wherein the at least one filter element comprises a pair of adjacent filter elements and the at least one injector is positioned in a space between the pair of adjacent filter elements.

4. The disc filter of claim 1, comprising a plurality of filter elements, wherein the at least one injector is located in a space defined between a pair of adjacent filter elements.

5. The disc filter of claim 1, wherein the primary flow vector of the secondary flow of liquid is between a pair of adjacent filter elements.

6. The disc filter of claim 1, wherein the primary flow vector of the secondary flow of liquid is parallel to a filtering lining of a filter sector of the at least one filter element.

7. The disc filter of claim 1, wherein the secondary flow of liquid from the at least one injector diverges vertically along the primary flow vector.

8. The disc filter of claim 1, wherein the primary flow vector of the at least one injector intersects with the shaft axis of rotation.

9. The disc filter of claim 1, wherein the secondary flow of liquid from the at least one injector contacts the rotor shaft and does not contact a surface of the at least one filter element.

10. The disc filter of claim 1, wherein the primary flow vector of the at least one injector is orthogonal to the shaft axis of rotation.

11. The disc filter of claim 1, wherein an outlet of the at least one injector comprises a major axis and a minor axis, wherein a length of the major axis is greater than a length of the minor axis.

12. The disc filter of claim 11, wherein a width of the outlet varies along the major axis.

13. The disc filter of claim 1, wherein an outlet of the at least one injector is disposed between an outer radius of the at least one filter element and the second wall of the vessel.

14. The disc filter of claim 1, wherein an outlet of the at least one injector is disposed between an outer radius of the at least one filter element and the rotor shaft.

15. The disc filter of claim 1, wherein the at least one injector is positioned below a fill level of the fiber suspension in the vessel.

16. The disc filter of claim 1, wherein the at least one injector is disposed at a vertical position above the rotor shaft.

17. The disc filter of claim 1, wherein the at least one injector is located in the second wall of the vessel at an injector elevation angle $\alpha_1$ that is greater than −44 degrees and less than or equal to +22 degrees relative to a shaft plane, wherein the shaft plane is a horizontal plane that includes the shaft axis of rotation.

* * * * *